(12) United States Patent
Burgbacher

(10) Patent No.: US 7,091,643 B2
(45) Date of Patent: Aug. 15, 2006

(54) POLYPHASE ELECTRIC MOTOR

(75) Inventor: Martin Burgbacher, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 121 days.

(21) Appl. No.: 10/797,518

(22) Filed: Mar. 9, 2004

(65) Prior Publication Data

US 2004/0178693 A1 Sep. 16, 2004

(30) Foreign Application Priority Data

Mar. 12, 2003 (DE) ................. 103 10 647

(51) Int. Cl.
*H02K 21/12* (2006.01)
(52) U.S. Cl. .............................. 310/156.53
(58) Field of Classification Search ...............
310/156.01–156.84, 216, 261, 166
See application file for complete search history.

(56) References Cited

U.S. PATENT DOCUMENTS

| | | | |
|---|---|---|---|
| 4,445,061 A | 4/1984 | Jackson et al. ............ | 310/156 |
| 4,700,098 A | 10/1987 | Kawashima et al. ....... | 310/186 |
| 5,078,590 A | 1/1992 | Høgseth et al. ............ | 425/589 |
| 5,097,166 A | 3/1992 | Mikulic ..................... | 310/156 |
| 5,331,245 A | 7/1994 | Burgbacher ................ | 310/186 |
| 5,679,995 A | 10/1997 | Nagate et al. .............. | 310/156 |
| 6,208,055 B1 | 3/2001 | Takahashi et al. .......... | 310/156 |
| 6,234,767 B1 | 5/2001 | Takeda et al. .............. | 417/355 |
| 6,239,525 B1 | 5/2001 | Matsunobu et al. ........ | 310/156 |
| 6,342,745 B1 * | 1/2002 | Sakai et al. ............ | 310/156.56 |
| 6,812,614 B1 | 11/2004 | Yamamoto et al. ......... | 310/261 |
| 2002/0047435 A1 | 4/2002 | Takahashi et al. ..... | 310/156.56 |
| 2002/0067096 A1 | 6/2002 | Yamamoto et al. ......... | 310/216 |
| 2004/0256940 A1 | 12/2004 | Tsuruta et al. ......... | 310/156.53 |

FOREIGN PATENT DOCUMENTS

| | | |
|---|---|---|
| DE | 198 51 883 A1 | 5/2000 |
| DE | 100 20 946 A1 | 11/2001 |
| EP | 0 343 457 | 11/1989 |
| EP | 1 067 656 A2 | 1/2001 |
| EP | 1 067 656 A3 | 1/2001 |

(Continued)

OTHER PUBLICATIONS

Magneticasoft, "MAGNETICA—Magnetostatics for personal computers," © 2000, pp. 1-2, found at www.magneticsoft.com/features.

(Continued)

*Primary Examiner*—Darren Schuberg
*Assistant Examiner*—Nguyen Hanh
(74) *Attorney, Agent, or Firm*—Milton Oliver, Esq.; Ware, Fressola, Van Der Sluys & Adolphson LLP

(57) ABSTRACT

An electric motor has a stator (28) and a rotor (36') separated therefrom by an air gap (39). The rotor has a plurality of salient poles with pole shoes (260A) facing toward the air gap, and a yoke (200). The pole shoes serve to generate a sinusoidal counter-EMF. Located between the yoke (200) and a pole shoe (260A) is a recess (266A) in which a permanent magnet (262A) is arranged. Adjacent to this recess (266A) on each side in the circumferential direction is a low-magnetic-conductivity region (266A', 266A") that is bounded by a retaining segment (270') made of ferromagnetic material. The latter serves to connect the pole shoe mechanically to the yoke (200). A magnetic shunt (274', 274") extends from a source segment (264A', 264A") to a target region (270''') of one of the retaining segments.

19 Claims, 17 Drawing Sheets

FOREIGN PATENT DOCUMENTS

| | | |
|---|---|---|
| EP | 1 164 684 A2 | 12/2001 |
| EP | 1 164 684 A3 | 12/2001 |
| EP | 1 566 876 A1 | 8/2005 |
| GB | 1 314 901 | 4/1973 |
| JP | 5-236 687 A | 9/1993 |
| JP | 2000-278896 | 10/2000 |
| WO | WO 2004-049541 A1 | 6/2004 |

OTHER PUBLICATIONS

Infineon Technologies, Munich, Germany, "Product Brief GMR-B6 & GMR-C6 Giant Magneto Resistor— the optimized angle sensor," © 2001, Ordering No. B112-H7829-X-X-7600, pp. 1-2; further details available at www.infineon.com.

Thomson Derwent English abstract of DE 100 20 946, Schneider et al./SIEMENS.

Esp@cenet English abstract of JP 2000-278896, publ. Oct. 2000.

Pat. abs. of Japan, English abstract of JP 52-236,687, publ. Sep. 10, 1993.

Pat. abs. of Japan, English abstract of JP 2000-278896-A, publ. Oct. 6, 2000.

Pat. abs. of Japan, English abstract of JP2002-281, 700-A, publ. Sep. 27, 2002.

\* cited by examiner

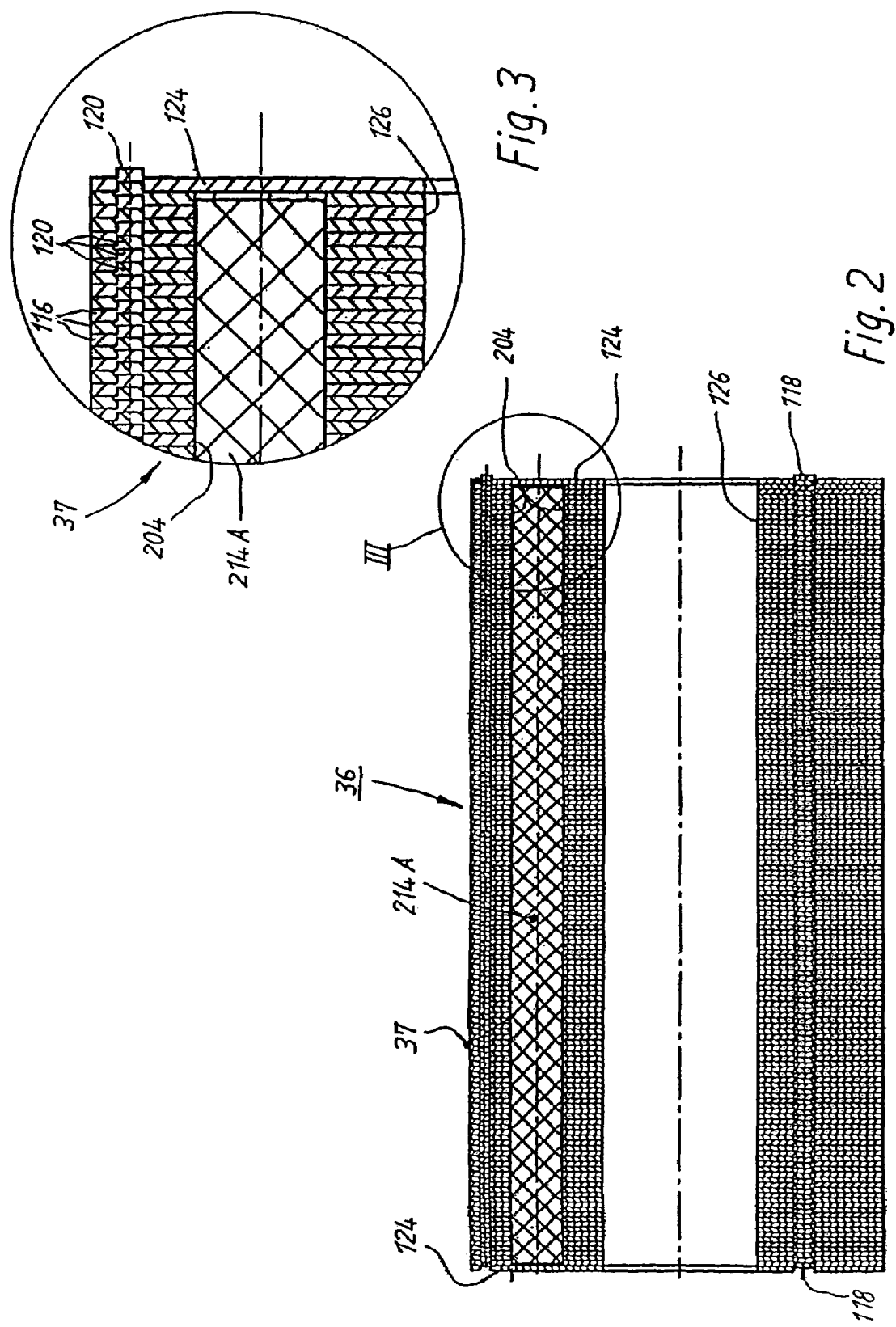

| Fourier | % |
|---|---|
| 1 | 100 |
| 3 | 0,1048 |
| 5 | 5,389 |
| 7 | 3 |
| 9 | 0,0133 |
| 11 | 0,9588 |

.# POLYPHASE ELECTRIC MOTOR

FIELD OF THE INVENTION

The invention relates generally to an electric motor comprising a stator that is equipped with a polyphase stator winding and is separated by an air gap from a rotor, the latter having, associated with it, a plurality of permanent magnets in order to generate a magnetic flux. More particularly, the invention relates to a polyphase electronically commutated electric motor having a more constant electromagnetic torque.

BACKGROUND

Such motors are known in numerous variants. In such motors it is important to prevent, in the rotor itself, short-circuits of the magnetic field of the permanent magnets that are used. To prevent this, low magnetic conductivity segments are used in the rotor; and mechanically load-bearing portions of the rotor, if they are made of ferromagnetically soft material, are at least locally configured to be so thin that they reach saturation during operation and then act practically like air, thus preventing or reducing a short circuit between adjacent rotor magnets.

In such rotors for polyphase motors, it is preferred to use a sinusoidal flux distribution in the air gap, i.e. a sinusoidal induced voltage (counter-EMF), and a sinusoidal drive current; in a three-phase system this results in a constant electromagnetic torque.

Experience has shown, however, that in such a motor it is difficult to generate an induced voltage that is a good approximation to the exact sinusoidal shape (or, expressed mathematically, has few harmonics); and because this is difficult, generation of a constant electromagnetic torque is also difficult.

SUMMARY OF THE INVENTION

It is therefore an object of the invention to provide a new polyphase electric motor having a more constant electromagnetic torque.

According to the invention, this object is achieved by means of at least one magnetic shunt which extends from a source segment near the air gap through a region of low magnetic conductivity to a target region of a retaining segment. As a result of the magnetic shunt that extends through the low magnetic conductivity region to the target region of an associated retaining segment, a small additional magnetic flux is injected into the region of the interpolar gaps between adjacent salient poles of the rotor; and it has been found that with this simple action, the shape of the counter-EMF, especially in the region around its zero transitions, can be better approximated to an exact sine-wave shape, this being expressed (when considered mathematically) as a decrease in the amplitude of at least some harmonics. The result is that a more uniform torque can be generated with such a motor. It is very advantageous in this context that because the at least one magnetic shunt is, so to speak, concealed inside the rotor, it has almost no influence on the so-called cogging torque. The latter can therefore be made very small, especially by selecting an optimum width for the permanent magnets that are used.

The location of the target region is defined by the designer as a function of the type of motor. That location depends, among other factors, on the actions necessary for the reduction of cogging torque in such a motor, and is usually determined empirically, i.e. on the basis of experiments.

A preferred refinement of the invention is to form the magnetic yoke of the rotor, its pole shoes, the retaining segments and the magnetic shunts as laminations of a lamination stack. Such a configuration greatly simplifies manufacture, since the individual laminations of such a rotor can be manufactured by punching; smaller recesses must be manufactured, as applicable, using different methods, e.g. by electrical discharge machining.

The low magnetic conductivity regions can be created easily by forming recesses in the lamination stack, since air is a poor magnetic conductor. Where such recesses are not an option, e.g. for stability reasons, it is possible to use segments made of ferromagnetic material that are at saturation and then act similarly to air.

BRIEF FIGURE DESCRIPTION

Further details and advantageous refinements of the invention are evident from the exemplary embodiments, in no way to be understood as a limitation of the invention, that are described below and depicted in the drawings, in which:

FIG. 2 is an enlarged longitudinal section through the rotor lamination stack of the motor of FIG. 1, seen along section line VI—VI of FIG. 5;

FIG. 3 is a further enlarged longitudinal section of a detail which, in FIG. 2, is designated III;

Figure 11:
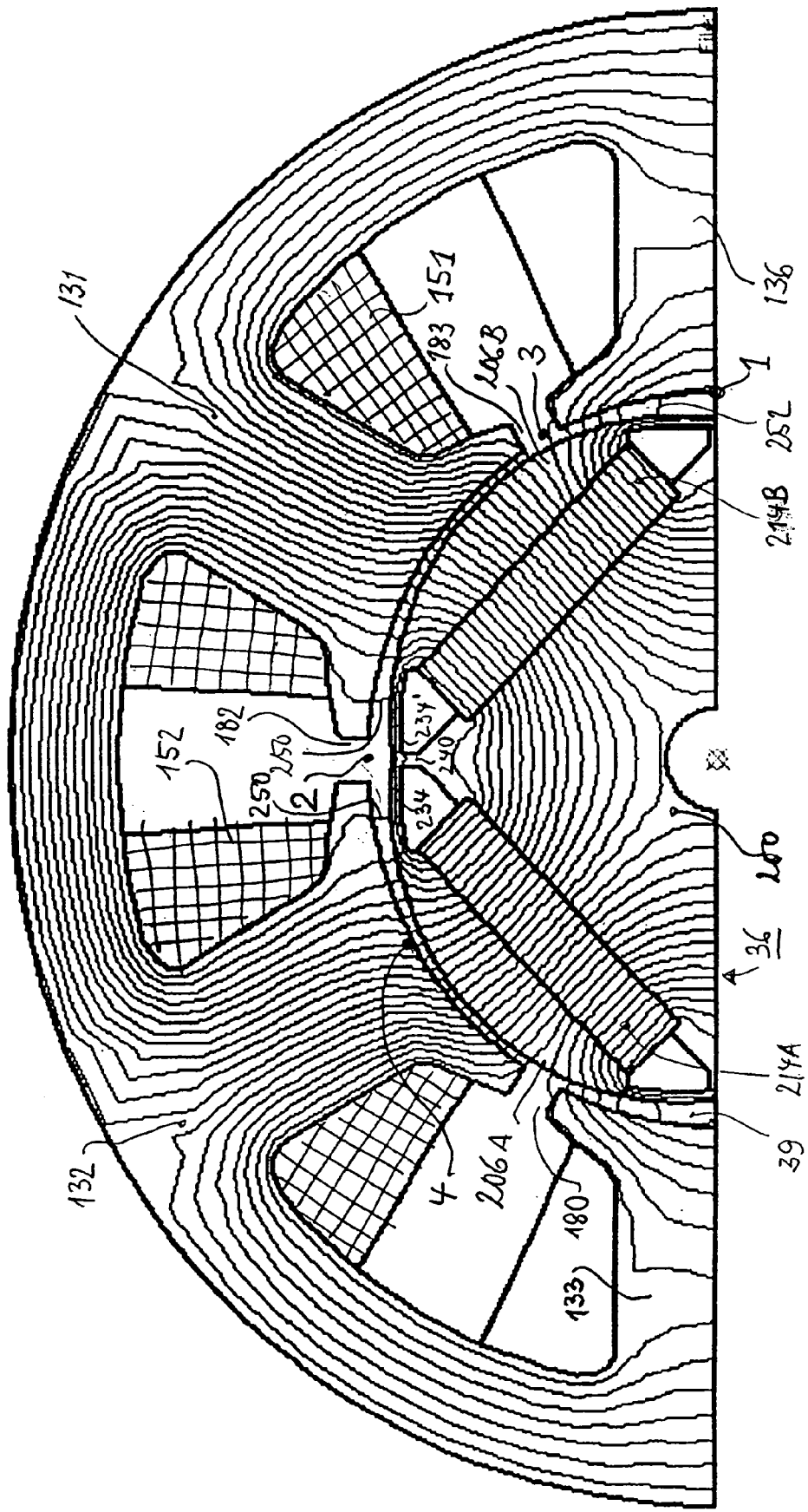
FIG. 11 is a view showing, for a specific rotor position, the distribution of the magnetic flux lines in one half of the motor; this view shows a flux distribution that deviates considerably from the sine-wave shape.
Figure 12:
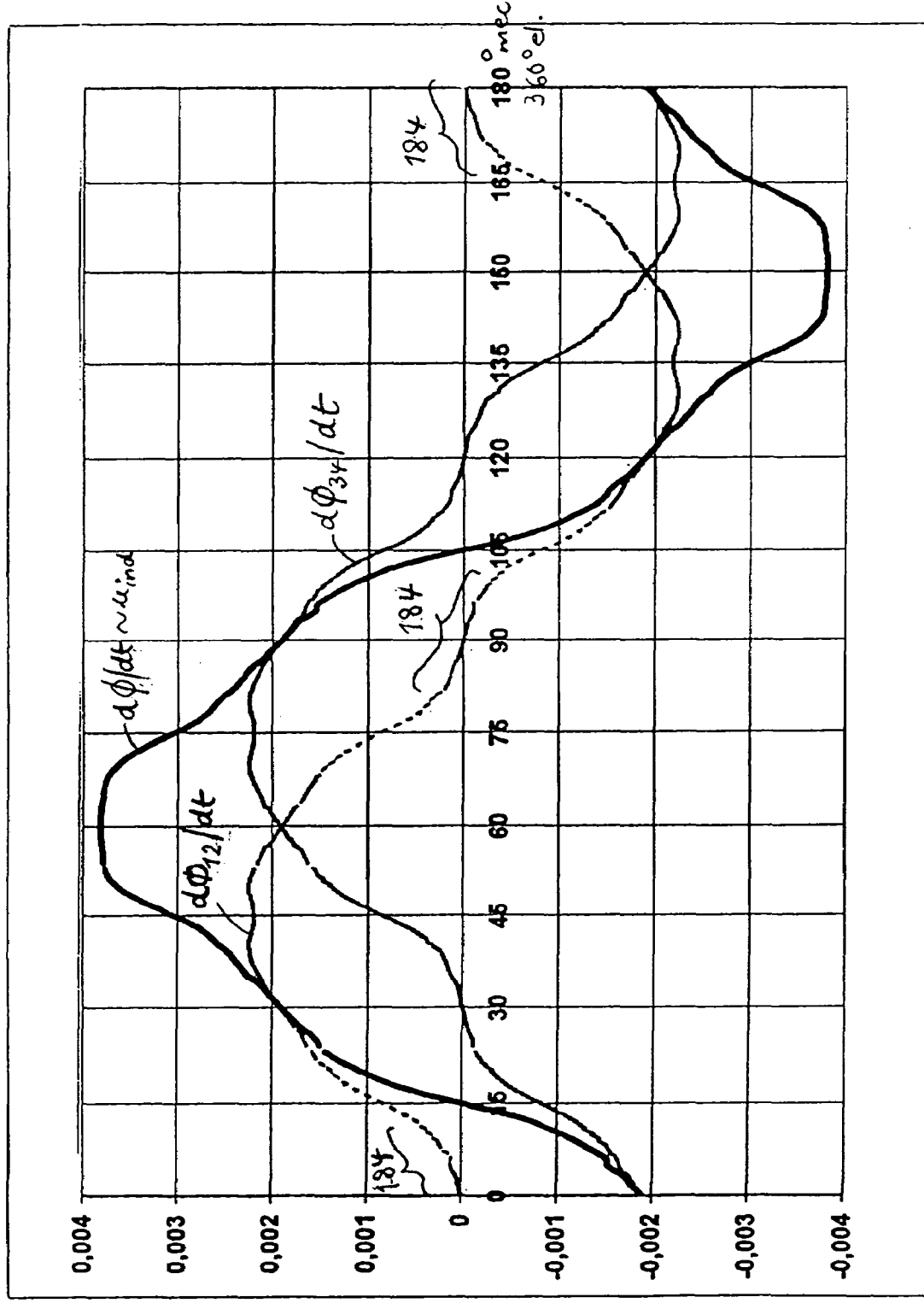

FIG. 12 is a graph of a flux change $d\emptyset 12/dt$ that occurs between points 1 and 2 in FIG. 11 when rotor 36 rotates at constant speed through an angle of 360° el.=180° mech.;

FIG. 12 further shows the behavior of a flux change $d\emptyset/dt$ that is calculated from $d\emptyset 12/dt$ and determines the shape of the counter-EMF $U_{ind}$.

Figures 13, 14:
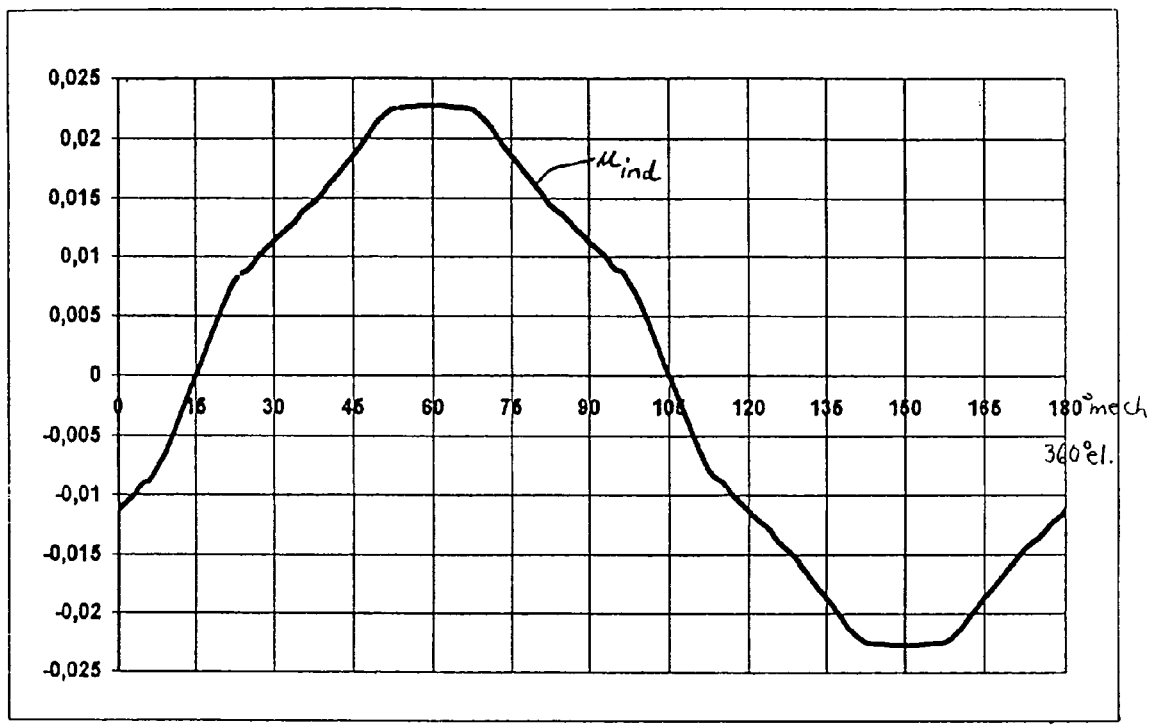
Figure 15:
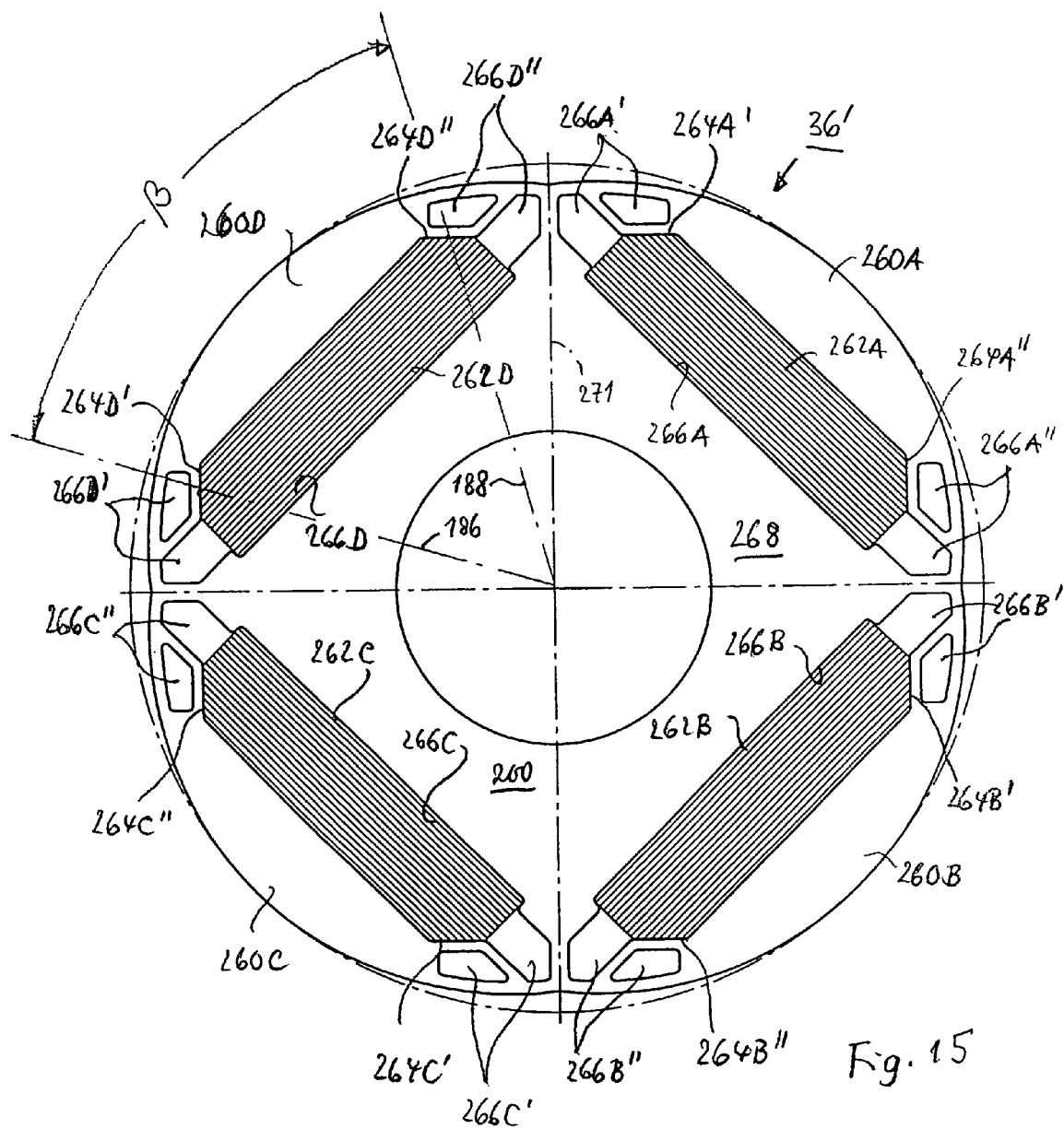
Figure 16:
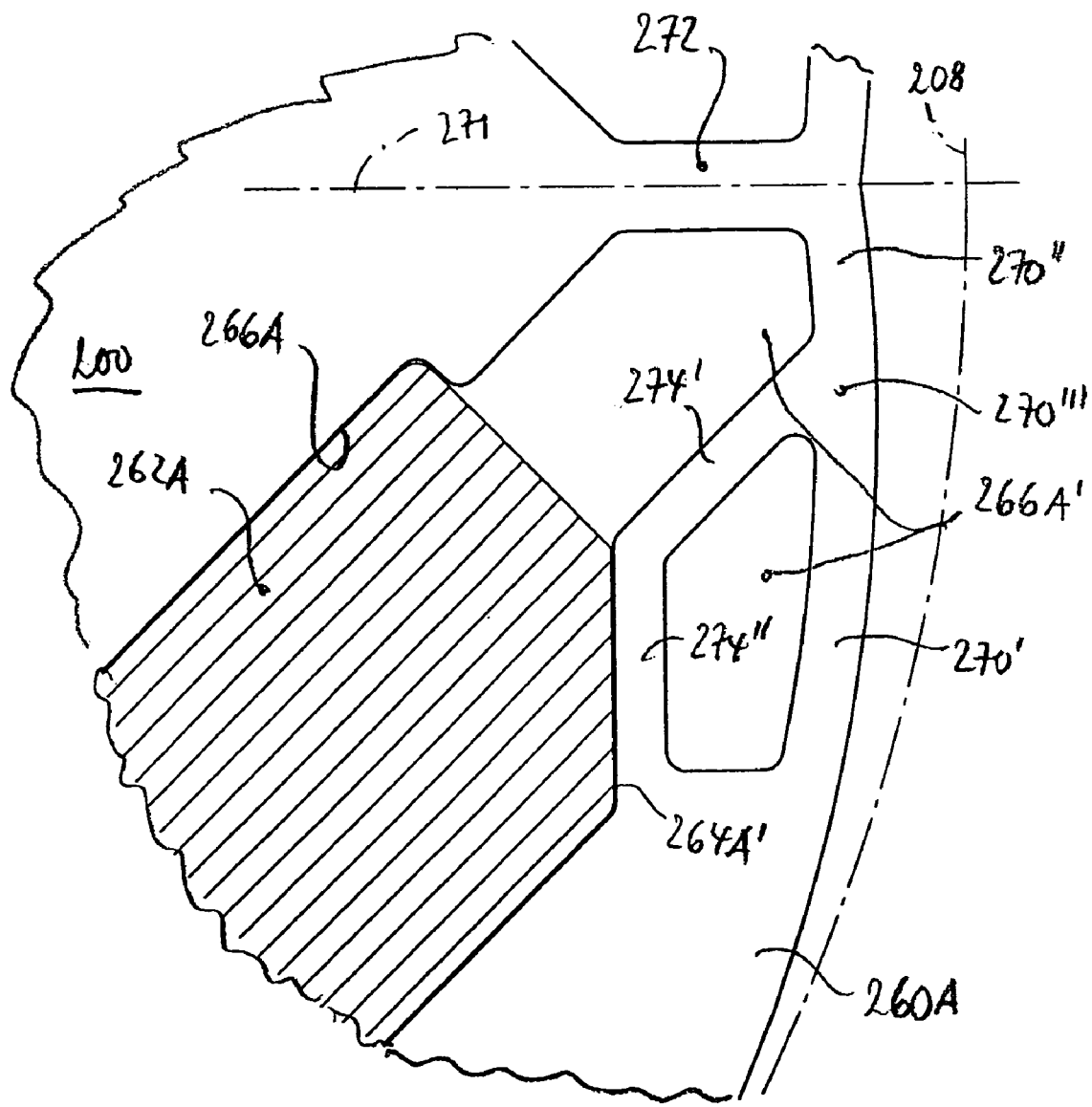
Figure 17:
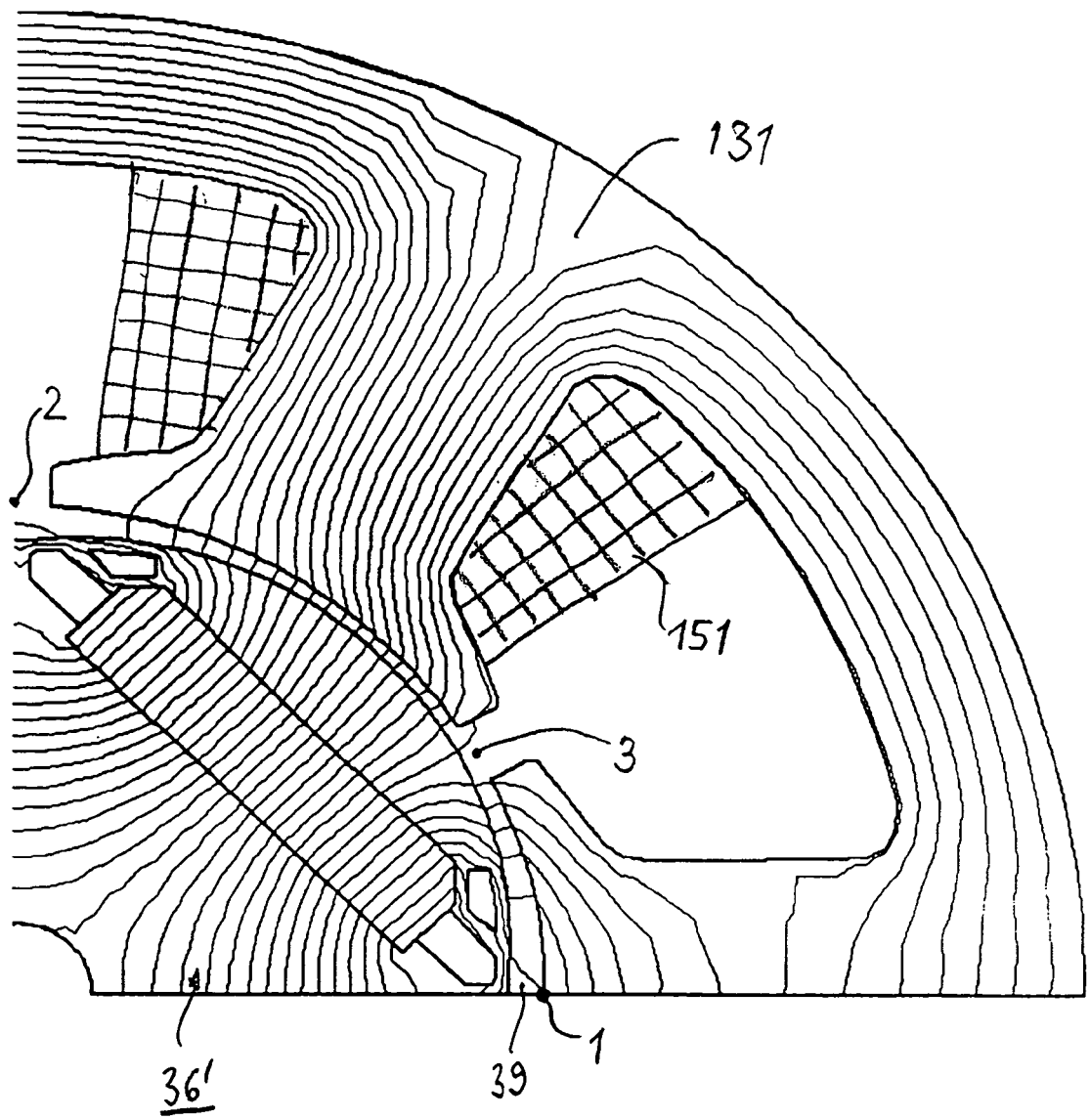
Figure 18:
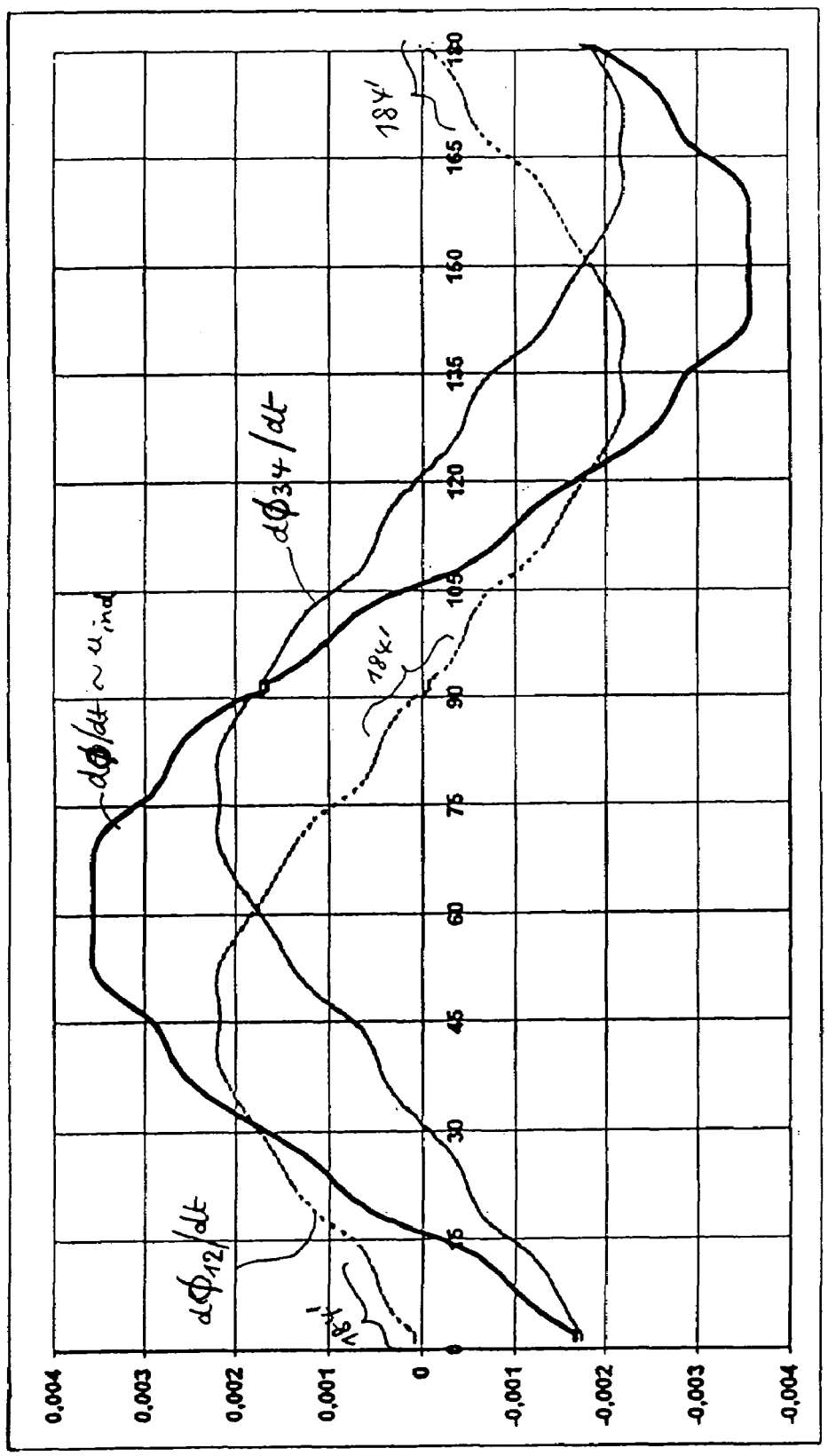
Figures 19, 20:
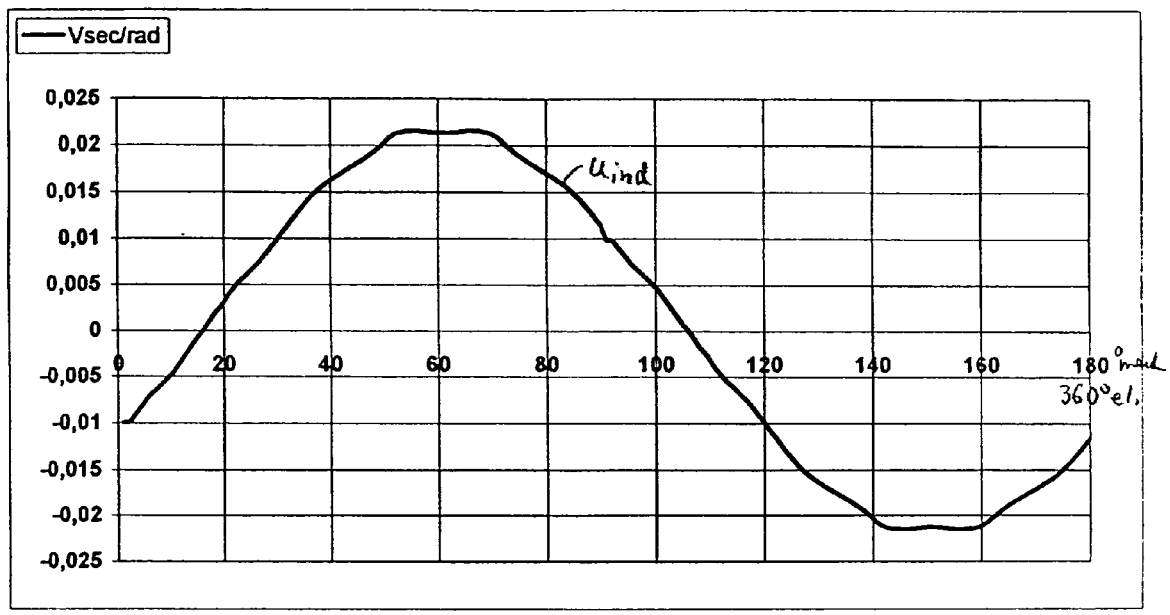
Figure 21:
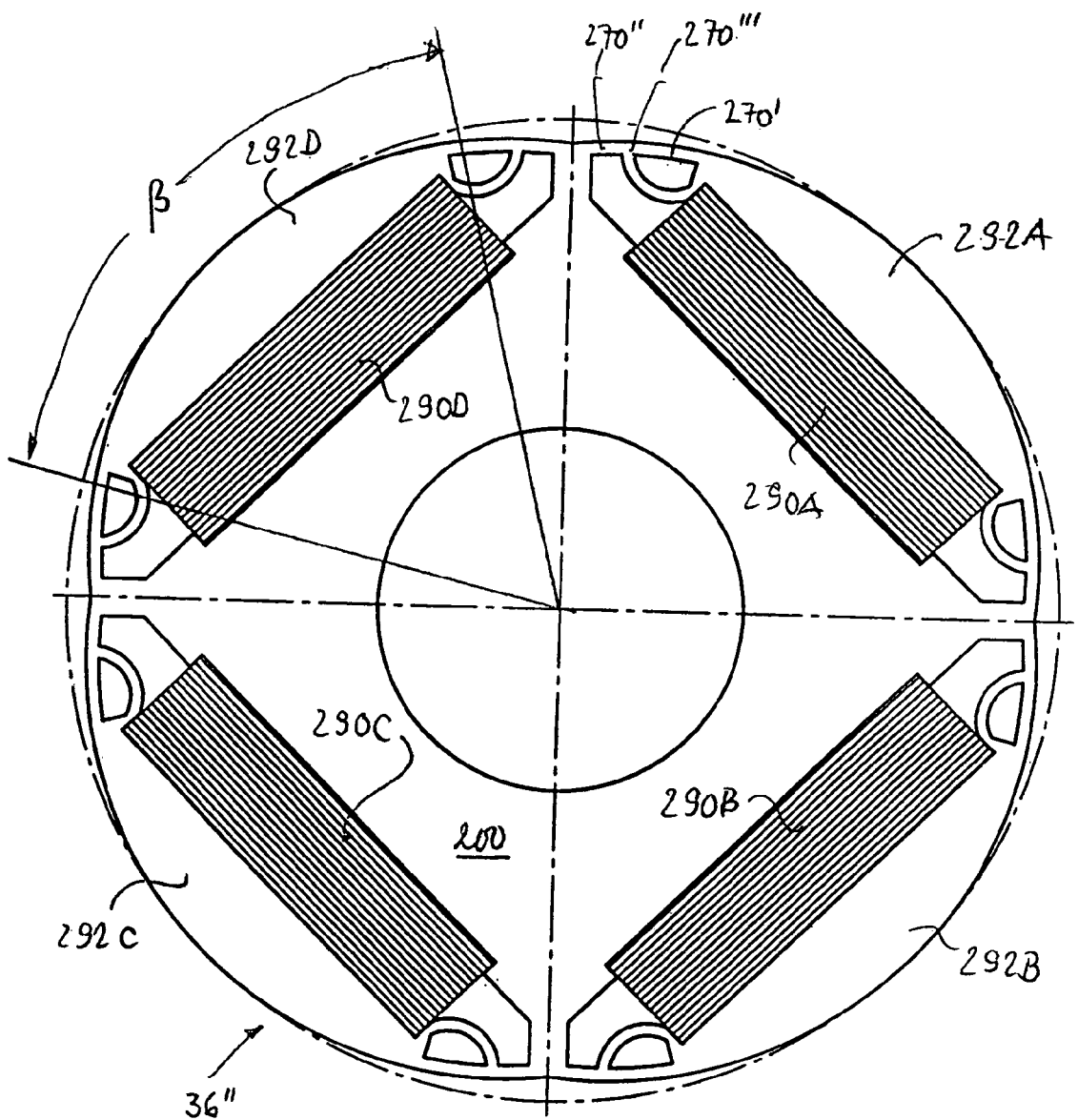
Figure 22:
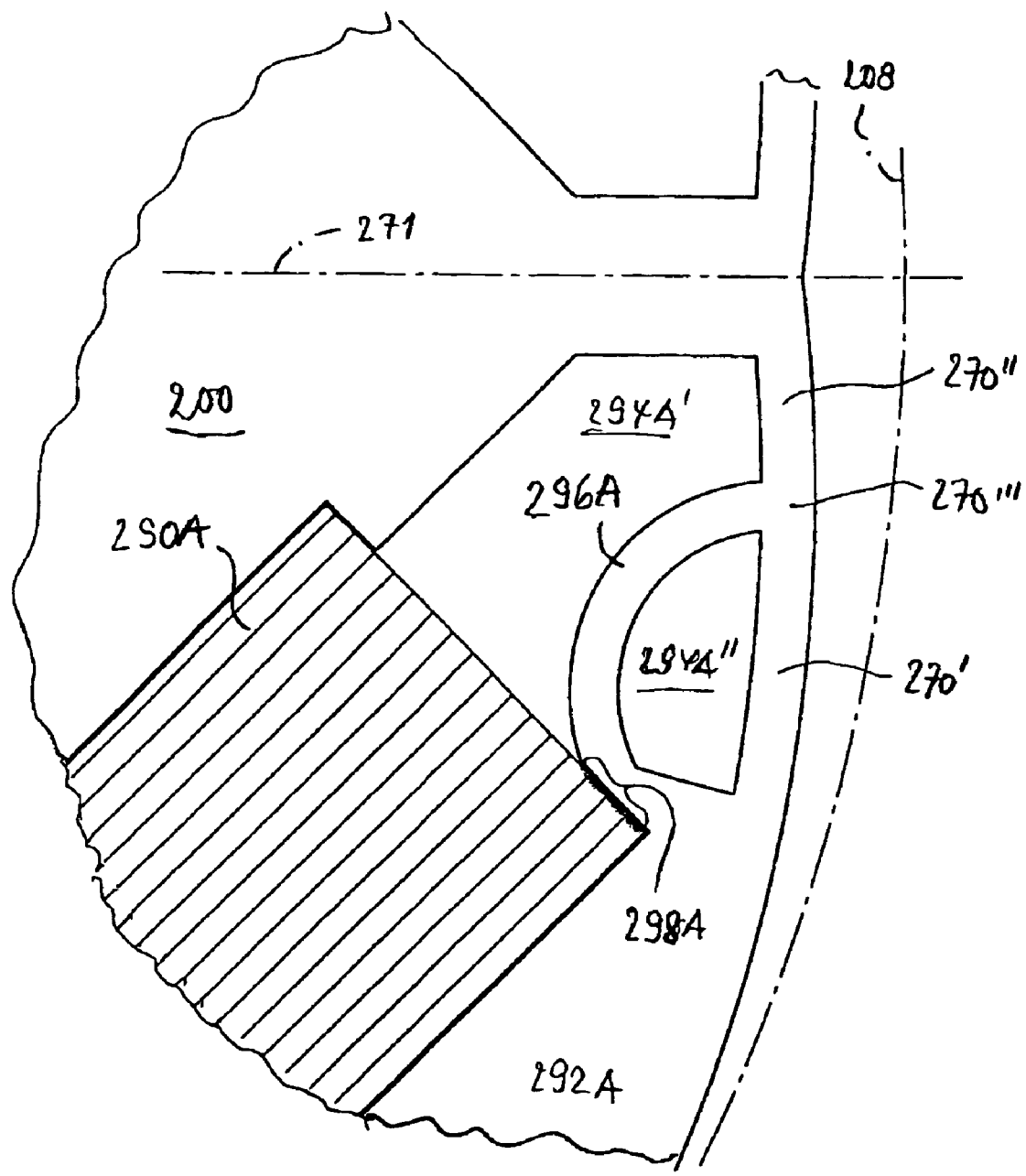

FIG. 13 depicts the counter-EMF $U_{ind}$ by analogy with FIG. 12;

FIG. 14 is a table showing a Fourier analysis of the voltage depicted in FIG. 13, the ordinal number of the harmonic being depicted on the left and its percentage on the right, e.g. 1st harmonic=100%;

FIG. 15 depicts an improved rotor shape according to a preferred embodiment of the invention, in which a small additional magnetic flux is injected in the region of the interpolar gap;

FIG. 16 is an enlarged view of a detail of FIG. 15;

FIG. 17 is a view similar to FIG. 11 but for rotor 36' according to FIG. 15; as a consequence of the flux injection, the flux distribution in the air gap here is a better approximation to the sine-wave shape;

FIG. 18 shows the flux change dØ12/dt that occurs between points 1 and 2 in FIG. 17 when rotor 36' rotates at constant speed through an angle of 360° el.=180° mech.; FIG. 18 further shows the behavior of a flux change dØ/dt that is calculated from dØ12/dt and determines the shape of the counter-EMF $U_{ind}$; flux change dØ/dt is a good approximation of a sine wave;

FIG. 19 depicts the counter-EMF $U_{ind}$ by analogy with FIG. 18;

FIG. 20 is a table showing a Fourier analysis of the voltage depicted in FIG. 18, the harmonic being depicted on the left and its percentage on the right, e.g. 3rd harmonic=0.22%;

FIG. 21 shows a rotor 36' according to a first variant of the rotor shape of FIGS. 15 through 17;

FIG. 22 shows an enlarged portion of FIG. 21; and

Figure 23:
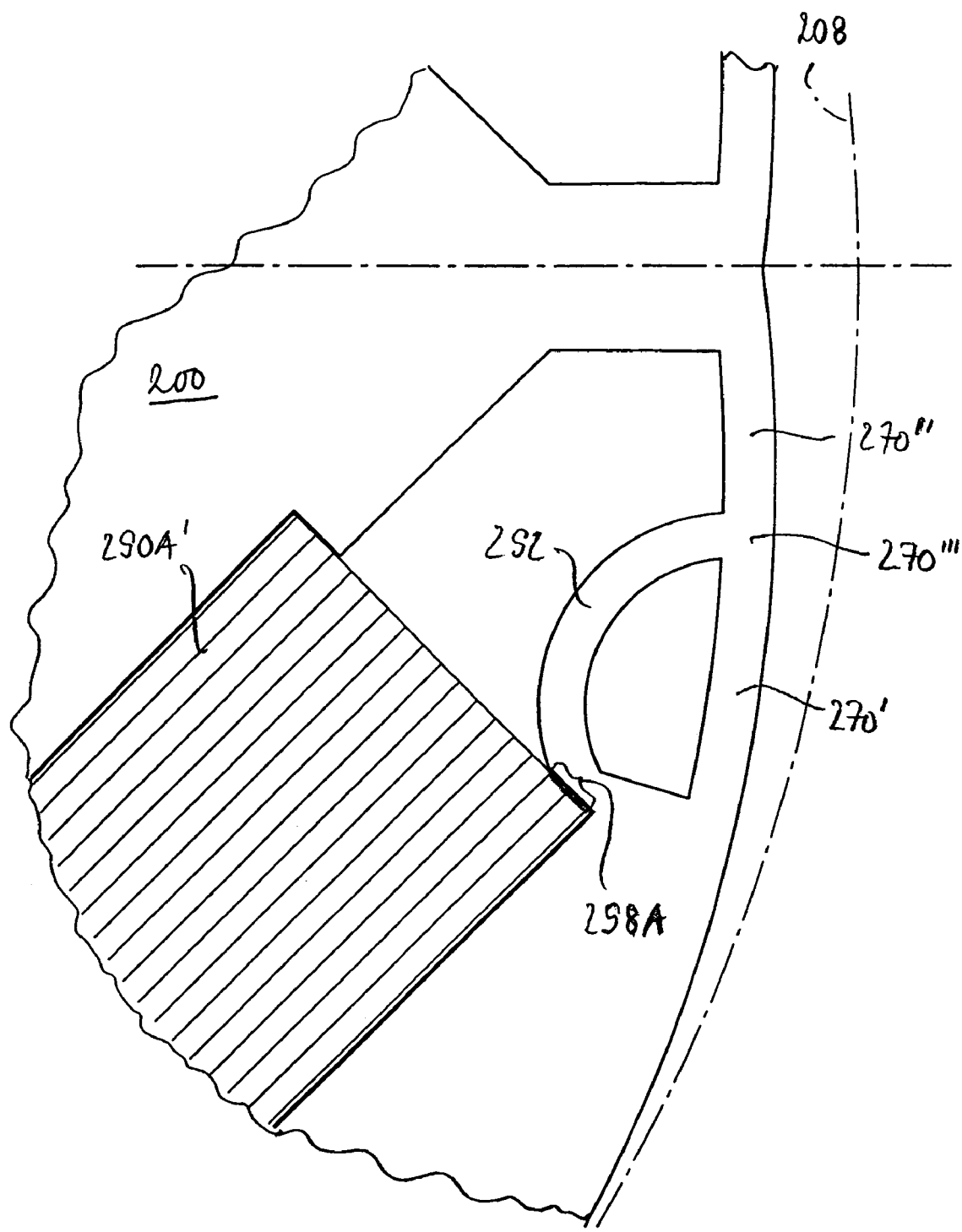

FIG. 23 shows a variant of FIG. 22.

DETAILED DESCRIPTION

Figure 1:
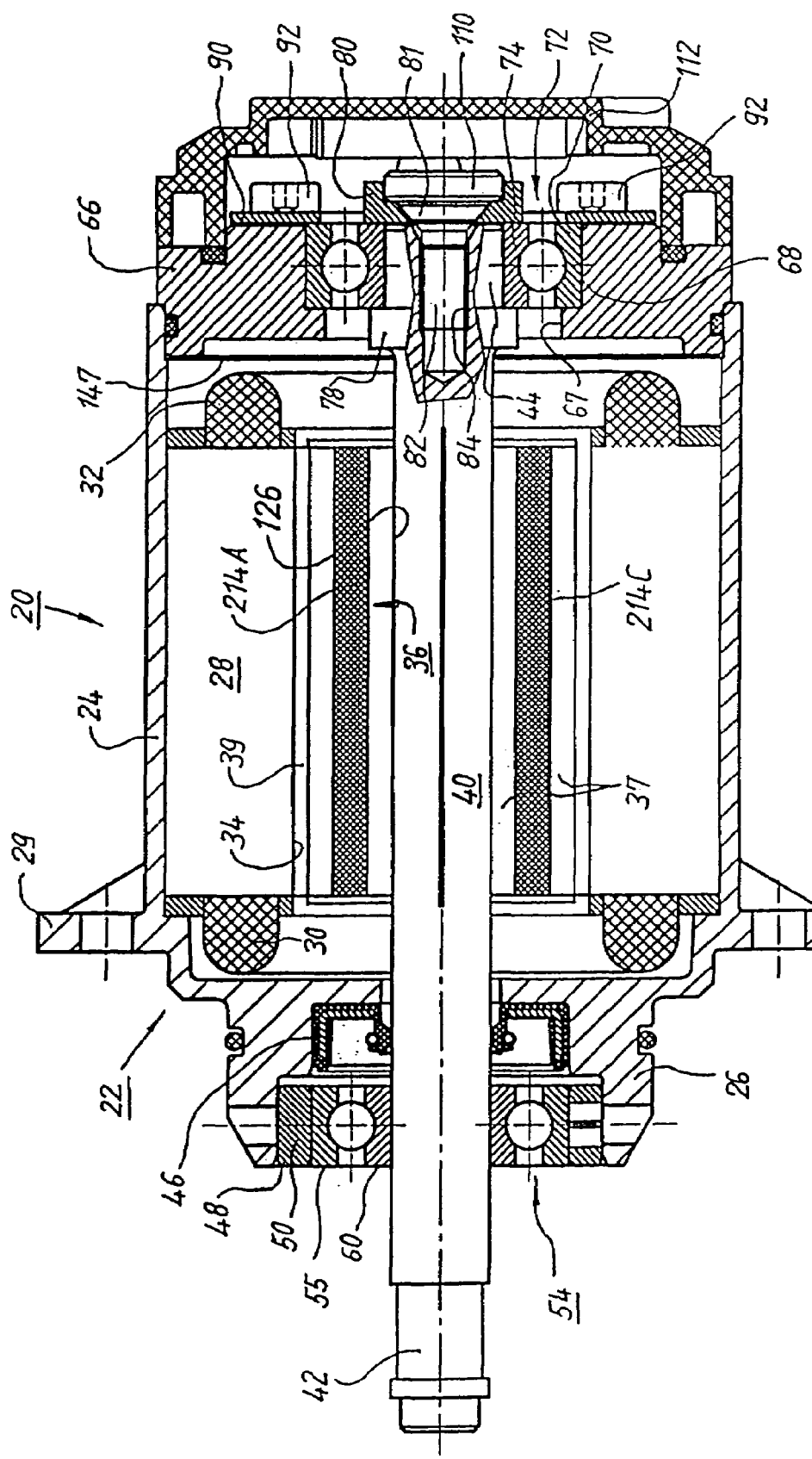
FIG. 1 is a longitudinal section through a three-phase sinusoidally commutated brushless DC motor according to a preferred embodiment of the invention.

FIG. 1 shows an electronically commutated internal rotor motor 20 with a housing 22 having a cylindrical housing portion 24, an A-side bell 26 and a securing flange 29.

Figure 9:
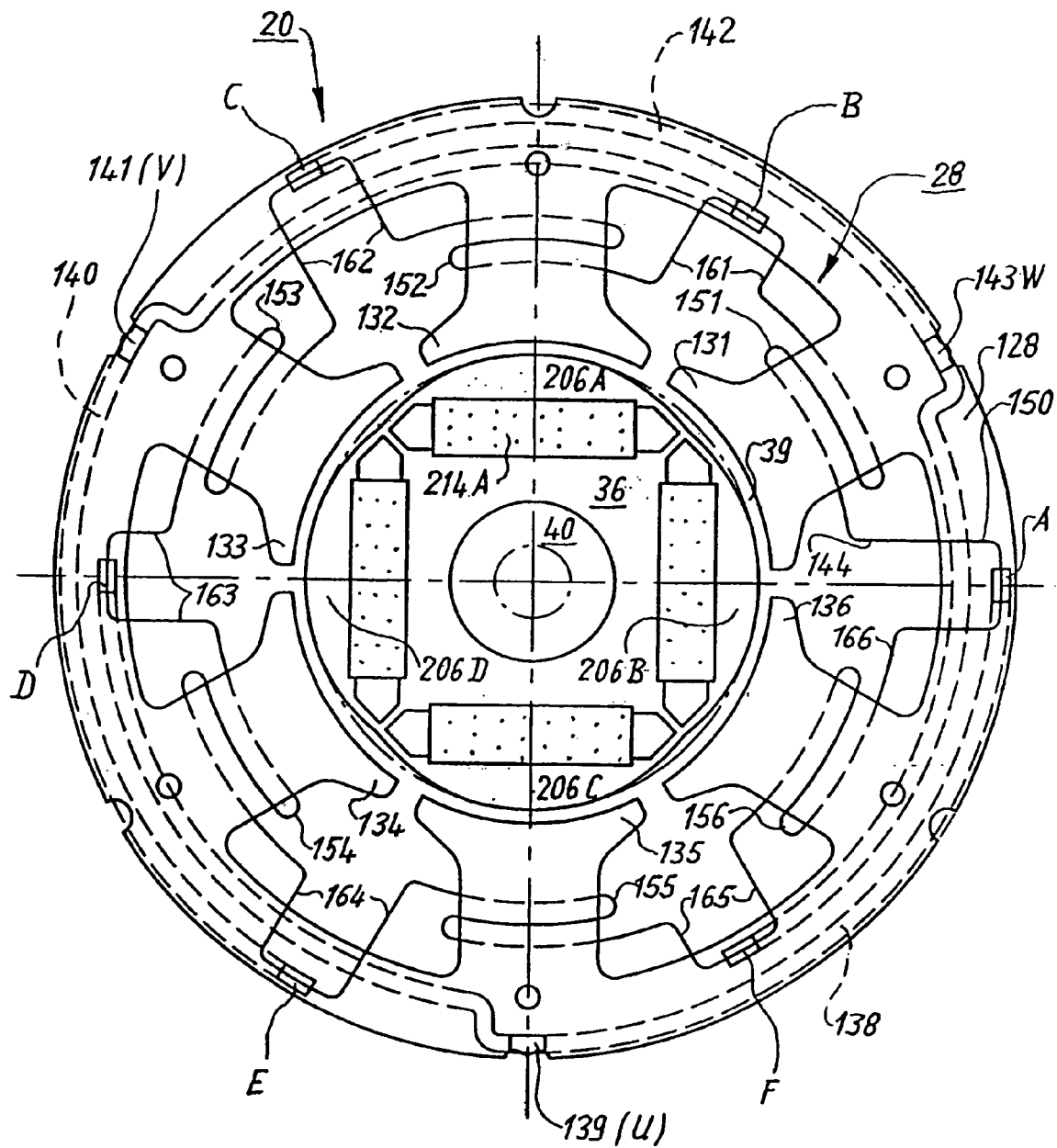
FIG. 9 is a view, in part schematic, of the stator and rotor of FIG. 1, seen in a conventional sectional view.
Figure 10:
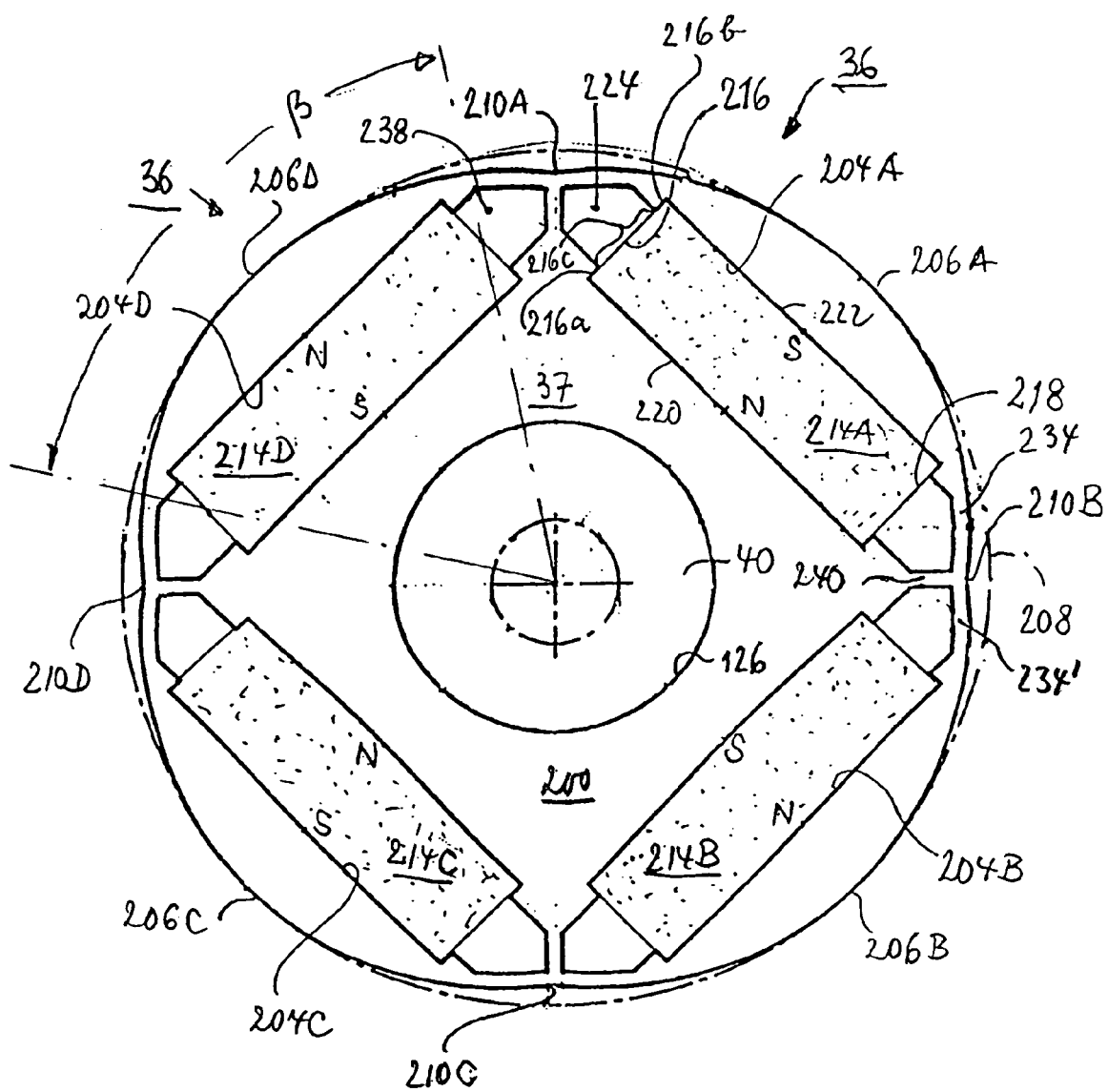
FIG. 10 is an enlarged view of the rotor, in a sectional view.

In the cylindrical housing portion 24, there is arranged the lamination stack 128 (FIG. 9) of an external stator 28 whose winding heads are designated 30 and 32. Stator 28 has an internal recess, in which a four-pole internal rotor 36 with a lamination stack 37 of electrical steel, preferably alloy V400, and with permanent magnets 214A through 214D (Cf. FIGS. 9–11), is arranged on a shaft 40 whose drive end is designated 42 and whose inner shaft end is designated 44. An air gap 39 separates stator 28 from rotor 36. Such a motor can also be called a "permanently excited synchronous internal rotor machine" or a "sinusoidally commutated brushless DC motor."

In the A-side bell 26, in the usual manner, a seal 46 is provided for the shaft 40. Also located there is a recess 48, into which is placed a guide element 50 for the outer race 55 of a ball bearing 54. The inner race 60 of ball bearing 54 is pressed onto shaft 40.

In the open end of cylindrical housing portion 24, a B-side bell 66 is secured. It has a recess 68 provided with an annular shoulder 67 for the outer race 70 of a ball bearing 72, whose inner race 74 is secured to shaft end 44. Shaft 40 has for that purpose a collar 78, with which it rests against the left side of inner race 74. Against the right side of inner race 74 rests a fitting 80 which is pressed by the countersunk head 81 of a countersunk screw B2 in the direction of shaft 40, and has an essentially annular shape. Screw 82 engages into an internal thread 84 in shaft end 44, and thereby presses the fitting 80 in the direction of inner race 74.

For secure holding-in of outer race 70, there is provided a flat, annular part 90, which is secured at its outer periphery to bell 66 using three evenly spaced screws 92. Part 90 rests with its radial inner portion against outer race 70, which it presses leftwards against shoulder 67. The recess 68 is somewhat shallower than the outer race 70.

The screw 82 is a flathead screw with a hexagonal recess. Fitting 80 is made of a non-ferromagnetic material, preferably brass.

After fitting 80 is secured, by means of screw 82, onto shaft end 44, a control magnet 110 is secured in a cylindrical recess of fitting 80, e.g. by gluing. Control magnet 110 is provided, on its right side as shown in FIG. 1, with a magnetization pattern, and serves for control of magnetoresistive sensors (not shown) which are arranged inside a housing cover 112 on the B-side of motor 20, and serve for detection of the rotational position of rotor 36, in order to exactly control the form and commutation of the currents in stator 28. Commutation by means of such rotor position sensors controlled by a control magnet 110 is known, in many variations, to those of ordinary skill in the art, and therefore requires no further explanation. The magnetization pattern on the right side of control magnet 110 is preferably created only after the magnet is secured in fitting 80, and this preferably occurs when the permanent magnets of rotor 36 are magnetized.

Figure 5:
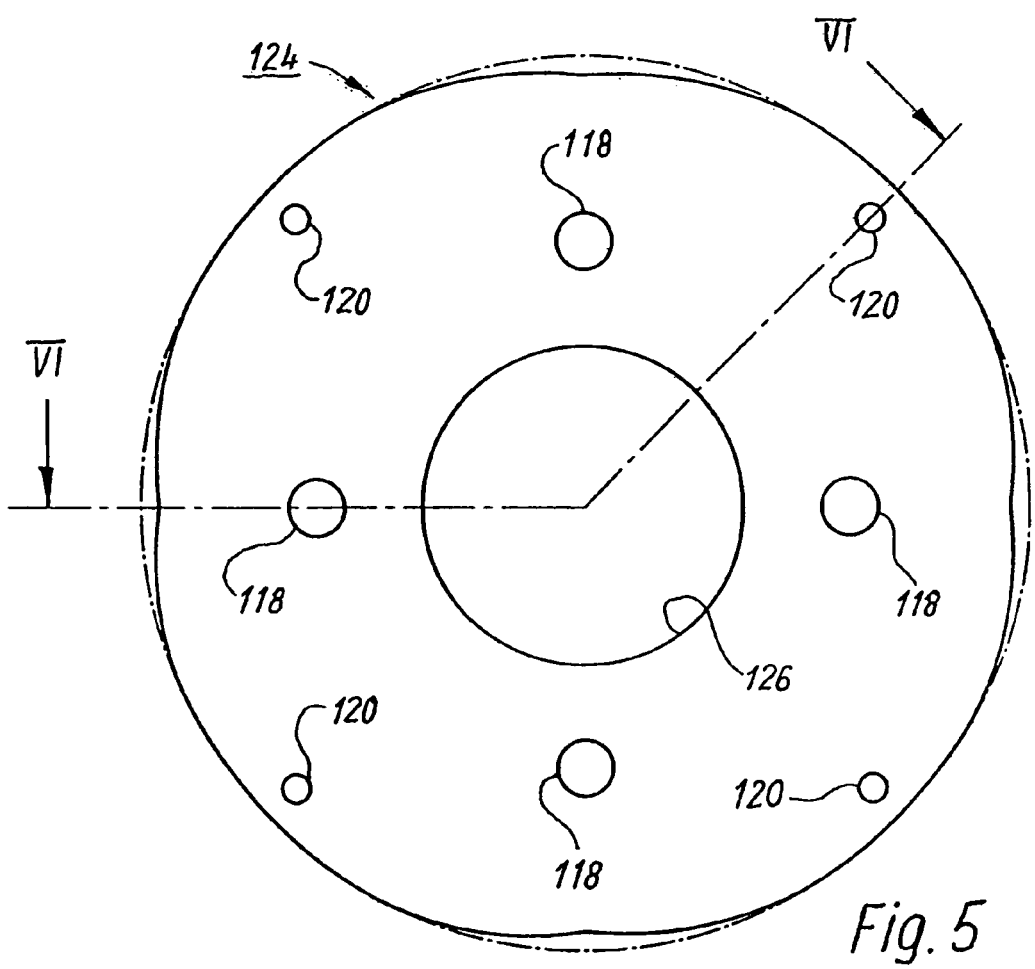
FIG. 5 is an enlarged plan view of an end disk of the rotor stack.

FIG. 2 is a section through the lamination stack 37 of rotor 36, looking along line VI—VI of FIG. 5. Lamination stack 37 is assembled from metal laminations 116, as shown greatly enlarged in FIG. 3.

Figure 4:
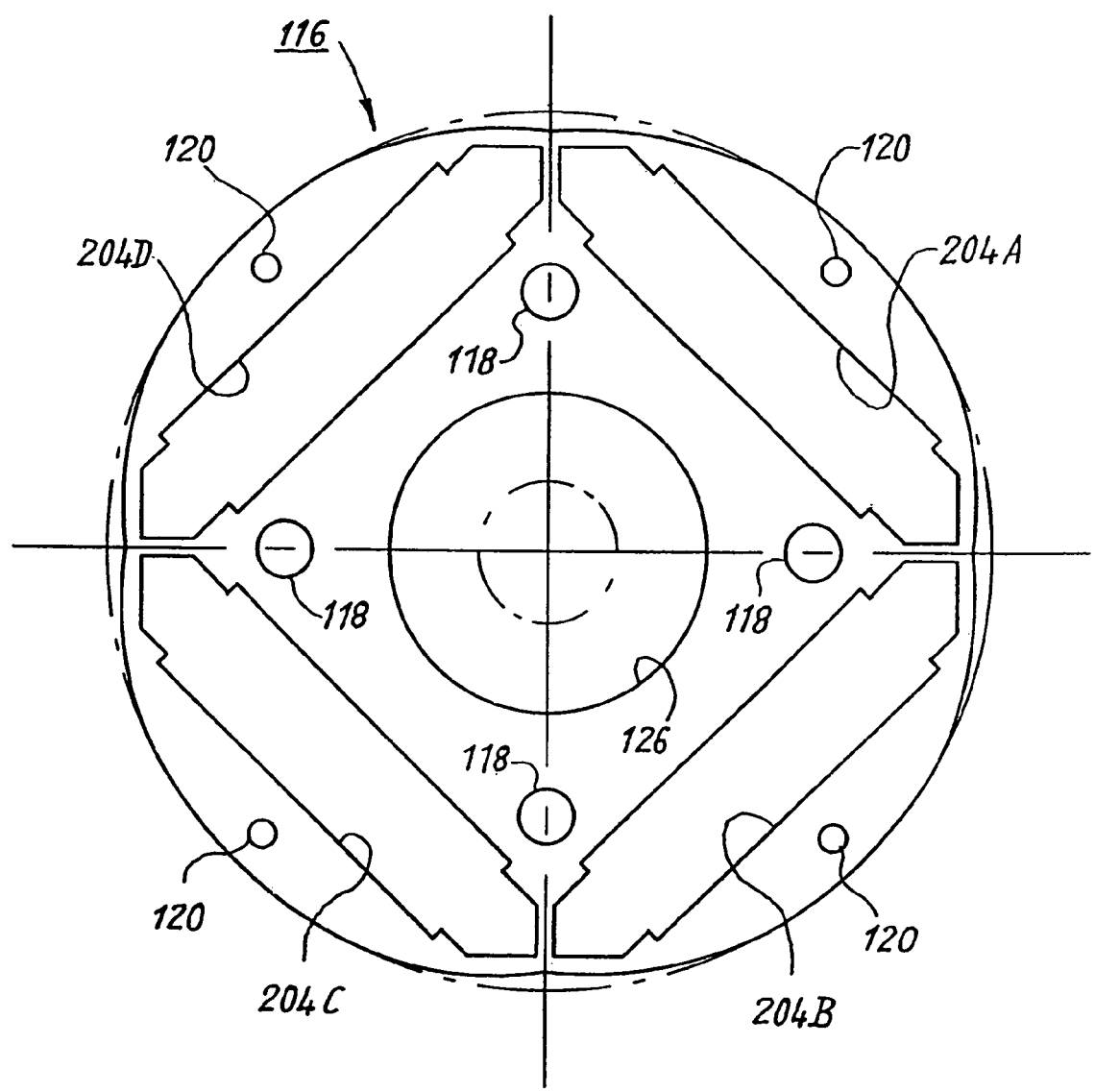
FIG. 4 is an enlarged plan view of a lamination of the rotor stack.

FIG. 4 is a plan view of such a lamination 116, e.g. of dynamo sheet iron V400, as described below in greater detail with reference to FIGS. 9–11. The lamination is provided with altogether eight bosses for a so-called "punch packetization," namely with four inner bosses 118, shown in the enlarged view of FIG. 7, and with four outer bosses 120, shown in the enlarged view of FIG. 8. FIG. 3 shows how the outer bosses 120 are pressed into each other and thereby hold the lamination stack 37 together. This representation is equally valid for the bosses 118, so that two adjacent sheets 116 are connected at a total of eight places by means of these boss engagements.

Located in lamination stack 37 are four neodymium-boron permanent magnets 214A through 214D in pockets 204A through 204D; cf. FIGS. 9–11. Preferably, these permanent magnets have a magnetic remanence of 1.2 T (Tesla). Pockets 204A through 204D are closed at both longitudinal ends of rotor 36 by identical endplates 124, of which one is shown in FIGS. 5–8. Such an endplate 124 differs from the rotor lamination sheets 116 in two respects:

a) It has no pockets 204.

b) It is made of a non-magnetic material, usually, for stability reasons, of a non-magnetic stainless steel, e.g. X12 CrNi 17.7. This endplate 124 preferably has the same contour or profile as rotor sheets 116 have. It similarly has four inner bosses 118 and four outer bosses 120.

Endplates 124 reliably prevent any fragments of a rotor magnet 214 from escaping from one of the pockets 204 into the interior of motor 20, e.g. into its air gap 39.

Figure 6:
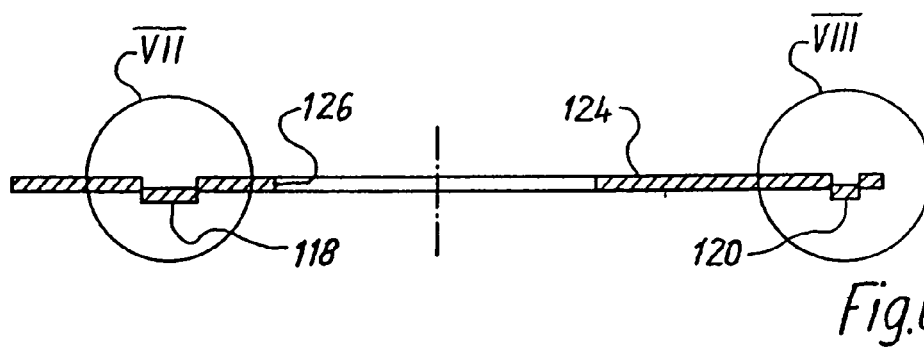
FIG. 6 is a section looking longitudinally along line VI—VI of FIG. 5.
Figure 7:
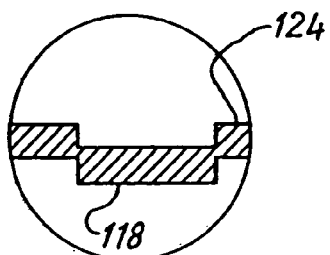
FIG. 7 is a more greatly enlarged view of detail VII of FIG. 6.
Figure 8:
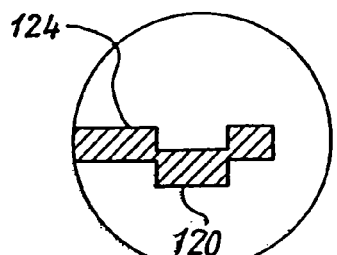
FIG. 8 is a more greatly enlarged view of detail VIII of FIG. 6.

FIG. 6 is a section through an endplate 124, from which the form of bosses 118, 120 is roughly recognizable, and FIGS. 7 and 8 show these bosses 118, 120 about five times enlarged. These bosses thus match exactly with those of rotor laminations 116, are assembled with them during the packetization, and are pressed together with them by a predetermined force in a press, in order to obtain specified values (tensile strength; shearing resistance).

Lamination stack 37 has an internal recess 126, into which the shaft 40 is pressed, which shaft thereby becomes a component of the magnetic circuit of the rotor 36.

FIG. 9 is a customary schematic illustration of an external stator 28, and of rotor 36. The stator arrangement 28 has a customary lamination stack 128 in which, within an angular range of 360° mech., six slots with slot teeth 131, 132, 133, 134, 135, and 136 are provided, defining between them corresponding slot openings, e.g. the slot openings designated 180 and 182 in FIG. 11. On a face side of the stator arrangement 28 are provided, in an insulator (not shown), a U-copper rail 138 with terminal lug 139, a V-copper rail 140 with terminal lug 141, and a W-copper rail 142 with terminal lug 143. These rails each extend over an angle of about 180° mech. and are arranged on the face side of stator arrangement 28. Since the copper rails 138, 140, 142 each extend over only 180° mech., at each point on the circumference there are only two copper rails, e.g. at the 12 o'clock position of FIG. 9, rails 142 (outer) and 140 (inner). Each rail has a central jog, and extends circumferentially over about 90° mech. in a radially outward position, and over about 90° mech. in a radially inward position, as shown in FIG. 9.

With reference to a clock face, the U-rail 138 extends approximately from 3 o'clock to 9 o'clock. The V-rail 140 extends from about 7 o'clock to 1 o'clock. The W-rail 142 extends from about 11 o'clock to about 5 o'clock. These rails are insulated from each other. Their terminal lugs 139, 141, 143 serve for electrical connection to a circuit board 147 (FIG. 1) bearing power transistors which control the currents in the stator winding. These are preferably load-independent sinusoidal currents supplied by a corresponding apparatus in the manner which is customary with such motors. By using the copper rails, one obtains extremely short and low-inductance power leads, and thereby low losses in these power leads, even at high RPM.

On the teeth of lamination stack 128 are identical wound coils, whose (consistent) winding sense is illustratively shown in FIG. 9. On a first tooth 131 is a first wound coil 151. One begins winding this coil, after the beginning end 150 of the winding wire 144 has been connected to U-rail 138 at a position A (3 o'clock).

Rail 142, at the point of terminal connection A, is completely surrounded by the aforementioned insulator, so that no short circuit between rails 138 and 142 is possible there. This is also true for the other rails, i.e. between the terminal connections, the rails are completely surrounded by the aforementioned insulator, and at these connection points, only the terminal for one rail protrudes from the insulator. Thereby, a high level of operating safety and reliability results.

After winding coil 151, one winds the second coil 152 on the second tooth 132, then the third coil 153 on the third tooth 133, then the fourth coil 154 on the fourth tooth 134, the fifth coil 155 on the fifth tooth 135, and finally the sixth coil 156 on the sixth tooth 136. Thus, this involves a non-overlapping short-pitch winding process which facilitates automated manufacturing, particularly since skewing of the stator slots can usually be omitted.

There is created, between coils 151 and 152, a first wire loop 161 which is electrically and mechanically connected to V-rail 140 at a point B (1 o'clock), preferably without breaking winding wire 144.

There is created, between coils 152 and 153, a second wire loop 162 which is connected to W-rail 142 at a point C (11 o'clock).

There is created, between coils 153 and 154, a third wire loop 163 which is connected to U-rail 138 at a point D (9 o'clock). Rail 138 thus electrically connects points A and D to each other.

There is created, between coils 154 and 155, a fourth wire loop 164, which is connected to V-rail 140 at a point E (7 o'clock). Rail 140 thus connects points B and E to each other.

There is created, between coils 155 and 156, a fifth wire loop 165, which is connected to W-rail 142 at a point F (5 o'clock). Rail 142 thus connects points C and F to each other.

The free end of coil 156 is designated 166, and is connected at point A to U-rail 138 and the winding beginning 150. Thereby, the winding is terminated.

From the foregoing description, it will be apparent that this is a three-phase winding without overlapping coils, in which in each phase, two coils are parallel-connected, namely coils 151 and 154 in the phase between terminals U and V, coils 152 and 155 in the phase between terminals V and W, and coils 153 and 156 in the phase between terminals W and U. In the manner usual in three-phase systems, an electronic control circuit (not shown) applies load-independent sinusoidal currents to these phases, in order to generate a substantially constant electromagnetic torque. Other multiphase systems can also be used if applicable, but the three-phase system is preferred, due to its simplicity.

FIG. 10 is a sectional view of the construction of four-pole rotor 36, at a greatly enlarged scale (about 5-fold enlarged). Its lamination stack 37 contains four identical pockets 204A, 204B, 204C, 204D, which are spaced from each other by an angular interval of 90° mech.=180° elec.

The four rotor poles are designated 206A through 206D and configured as salient poles. In order to highlight this, a cylinder 208, surrounding the rotor 36, is indicated by a dash-dotted line. One recognizes that the lamination stack 37 has, in the region of each of its interpolar gaps 210A through 210D, a slightly smaller diameter, which can be e.g. 97% of the diameter at the center of each pole, the diameter continuously increasing from interpolar gap to pole center. This increase can correspond, for example, to a circular arc segment. Due to this configuration, the flux distribution along the rotor circumference becomes substantially sinusoidal, so that, in operation, one obtains a sinusoidal counter-EMF.

The pocket 209A, shown enlarged as an example in FIG. 11, extends between interpolar gaps 210A and 210B; pocket 204B extends between interpolar gaps 210B and 210C, etc. as shown. In each pocket is located a respective substantially rectangular, radially magnetized permanent magnet 214A through 214D, preferably a neodymium-boron magnet with a magnetic remanence of 1.2 Tesla; in a preferred embodiment of the rotor, it had cross-sectional dimensions 3.5 mm×12 mm and a length of 27 mm. The direction of magnetization alternates; i.e. magnet 214A has a south pole radially outside, the next magnet 214B has a north pole outside, etc., as shown. As an indication of the width of magnets 214A through 214D, there is drawn in at magnet 214D an angle beta that here is approximately 66° mech.=132° el. As shown, this angle beta is delimited by two lines that pass through the centers of the pole ends. The magnitude of angle beta has a very great influence on the magnitude of the reluctance torque, also called "cogging torque," generated by rotor 36 as it rotates. This is explained below.

Pockets 204A, 204B, etc. are, in cross-section, longer than the permanent magnets 214A, 214B, etc. and thus are not completely filled by them. This is explained below using pocket 204A as an example, since the other pockets 204 and permanent magnets 214 have the identical structure.

Magnet 214A has an upper longitudinal end 216 facing interpolar gap 210A and a lower longitudinal end 218 facing interpolar gap 210B. With its wide ends 220 (radially inner) and 222 (radially outer), it abuts, with its full surface, lamination stack 37. By contrast, its upper longitudinal end 216 abuts only against two short shoulders 216a (radially inner) and 216b (radially outer) of lamination stack 37, while with a central region 216c of upper longitudinal end 216 it borders a hollow space 224 which, in this example, has the cross-sectional form of an irregular pentagon. Hollow space 224, and the corresponding seven other hollow spaces, each have low magnetic conductivity and therefore each form a magnetic resistance between adjacent permanent magnets 214 and thus prevent a magnetic short circuit between the four permanent magnets 214A through 214D. Clearly, the relationships at lower end 218 of permanent magnet 214A are identical, and therefore need not be separately described.

Hollow space 224 has, as shown in FIG. 11, a radially inner edge which runs essentially parallel to inner pocket edge 220 and connects via shoulder 216a to inner pocket edge 220.

Similarly, hollow space 224 has a radially outer edge which runs parallel to outer pocket edge 222 and connects thereto via a shoulder 216b.

The outer edge connects at an obtuse angle to an outer edge which runs essentially parallel to the adjacent periphery of rotor 36, and extends almost to interpolar gap 210A. Extending there is a narrow land 234 (FIG. 11) having a width of, e.g., 0.5 mm, to about interpolar gap 210A. Between hollow space 224 and the mirror-symmetric hollow space 238 of pocket 204D, there also extends a narrow land 240 (FIG. 11) which may have a width of, e.g., 0.5 to 1 mm and a length of 1 mm.

In an optimized embodiment, the shoulder 216b had a width of about 0.5 mm and the edge face 228 had a width of about 1 mm. This structure resulted in a total cogging torque whose value was practically zero.

As is apparent, narrow segments 234, 240, etc. have principally a mechanical load-bearing function. Segment 234 operates in saturation because of the high magnetic flux density (approx. 2 Tesla), and therefore acts magnetically like an air gap.

Experience has revealed that the size of shoulder 216b, and its relationship to the length of edge face 228, very strongly influence the magnitude of the cogging torque, as does the magnitude of angle beta, so that, by optimization of these dimensions, the cogging torque can be made very small or actually zero. Thereby, one avoids the need to skew the slots of the stator and/or to use an overlapping winding, which would cause higher manufacturing costs. Such a rotor 36 thus has very good characteristics for use as the drive for a power-assisted steering system.

Two factors, among others, are important in terms of the practical utility of a motor according to FIGS. 1 through 10:

a) The magnitude of the cogging torque.

This torque can be measured when the motor is currentless and is being driven externally. This torque should be as small as possible, since it might be troublesome to a user. It is optimized principally by optimizing the width beta of the permanent magnets, that width being approximately 130 to 135°, for example in FIG. 10.

b) The uniformity of the electromagnetic torque generated by the motor in operation. In a three-phase motor, it is usual to use a system in which three sinusoidal currents, offset 120° el. in phase, are conveyed to the stator windings. If the motor has an induced voltage (counter-EMF) that is sinusoidal in shape, it is known that a constant electromagnetic torque results in such a case.

A prerequisite for a sinusoidal induced voltage is that the flux distribution in air gap 39 of the motor be sinusoidal.

FIG. 11 shows, in slightly distorted form, the flux distribution in air gap 39 for a motor whose configuration corresponds approximately to FIG. 9. It is apparent that the flux is concentrated principally in the region of permanent magnets 214A, 214B; and that in the region of lands 234, 234', 240 which mechanically connect pole shoes 206A, 206B to magnetic yoke 200, i.e. in the region of the interpolar gaps, a very small magnetic flux 250, 252 is present, so that the induced voltage there becomes very low and thus deviates greatly from a sinusoidal shape.

FIG. 9 shows a short-pitch winding in which a slot 180 lies between stator poles 133 and 132. A slot 182 lies between stator poles 132 and 131 (cf. FIG. 11), and a slot 183 between stator poles 131 and 136 (cf. FIG. 11). Slots 180, 182 have a spacing of 120° el. Slots 182, 183 likewise have a spacing of 120° el. The winding on pole 132 is designated 152, and the winding on pole 131 is designated 151.

Four points are plotted in FIG. 11:

Point 1 lies at the center of stator pole 136.

Point 2 lies in interpolar gap 182 between stator poles 132 and 131.

Point 3 lies in interpolar gap 183 between stator poles 131 and 136.

Point 4 lies at the center of stator pole 132.

When rotor 36 rotates, two flux changes are obtained that can be calculated analytically.

The one flux change is that between points 1 and 2 of FIG. 11, and is therefore designated dØ12/dt in FIG. 12.

The other calculable flux change is that between points 3 and 4 of FIG. 11, and is designated dØ34/dt in FIG. 12. These are therefore flux changes that occur when rotor 36 rotates.

Adding these two flux changes together yields the change in total flux dØ/dt in stator pole 131 as a function of time and rotation angle, and this change corresponds to the behavior of the induced voltage $U_{ind}$ in stator winding 151 as rotor 36 rotates.

A winding 152 (or 151) that encompasses a flux of less than 180° el. is called a short-pitch winding. The voltage that is induced in winding 151 consequently has a different behavior from a voltage that would be induced in a fictitious winding (not present here) whose stator pole had an extension of 180° el., which is therefore referred to as a "full-pitch winding."

Magnetic flux changes dØ12/dt and dØ34/dt that occur in the context of one revolution of rotor 36 can be calculated, using customary analytical methods, from diagrams similar to FIG. 11. Those changes are depicted in FIG. 12, and it is evident that in the region of their zero transitions, e.g. at 0° el., they have very flat segments 184; this is unfavorable in terms of the behavior of the electromagnetic torque of such a motor.

From dØ12/dt, one can calculate the curve for flux change dØ/dt in stator pole 131, which determines the curve for induced voltage $U_{ind}$ in winding 151 and thus the curve of the electromagnetically generated torque.

According to FIG. 12, this is done by replotting flux change dØ12/dt, with a phase shift of 30° mech.=60° el., as dØ34/dt; these two flux changes, by addition, yield flux change dØ/dt as depicted in FIG. 12. This flux change dØ/dt governs the behavior of the electromagnetically generated torque, and determines the shape of the motor's counter-EMF, which is commonly referred to in electrical engineering as the "induced voltage $U_{ind}$." It is apparent from FIG. 12 that flux change dØ/dt, and thus the counter-EMF, are not strictly sinusoidal but in fact deviate greatly from that shape.

FIG. 13 shows the induced voltage $U_{ind}$ whose shape is practically identical to that of flux change dØ/dt; and FIG. 14 shows the result of a Fourier analysis. Because of the short pitch of the stator winding, the 3rd harmonic is small but the 5th, 7th, and 11th harmonics are large, and the result is a correspondingly unfavorable electromagnetic torque.

FIG. 15 shows, in enlarged fashion, a rotor 36' with which an induced voltage can be generated that is a much better approximation to the sinusoidal shape. Rotor 36' has four salient poles with pole shoes 260A through 260D, the external shape of the latter being configured to generate a sinusoidal magnetic flux as likewise depicted and described in FIGS. 9 and 10. The stator corresponds to what is depicted in FIG. 9, and is therefore not shown again.

Magnets 262A, 262B, 262C, 262D have on their radial outer sides trapezoidally beveled corners 264A', 264A", 264B', 264B", etc., and the pockets 266A through 266D for receiving these magnets have a corresponding shape; each continues to the left into a two-part recess 266A'and to the right into a two-part recess 266A" and analogous recesses 266B', 266B", etc. These recesses are each subdivided by a magnetic shunt whose function will be described below.

FIG. 15 shows an angle beta that characterizes the width of magnets 262A through 262D. It is defined as the angle between two straight lines 186, 188 that pass through the centers of oblique surfaces 264D', 264", and here equals approx. 58° mech.=116° el.

This angle beta is important in terms of the magnitude of the previously explained cogging torque, which should be minimal. With this construction using beveled magnets 262, the optimum for angle beta lies between approximately 110 and 120° el.

This optimum is ascertained as follows: Firstly, a theoretically optimum value for beta, given the selected motor construction, is determined by calculation. Because of nonlinear effects in the magnetic circuit, this calculated optimum does not correspond exactly to the actual optimum. Practical experiments are therefore then performed in the region of the calculated optimum, thus yielding the actual optimum at which the cogging torque is lowest; for a given motor construction, that optimum lies in a very narrow range of angle beta.

This optimum varies depending on the construction, e.g. by 1 to 5° el., in accordance with a difference in magnet width that is usually on the order of 0.5 mm; in other words, a difference of 0.5 mm in magnet width can make the difference between a good and a bad motor.

For further explanation, the reader is referred to the even more greatly magnified depiction of FIG. 16, which shows an enlarged portion of FIG. 15. A thin land having two segments 270' and 270" interconnected by a target region 270''', and a radial portion 272, provide mechanical retention of pole shoe 260A on magnetic yoke 200. Target region 270''' is located, as depicted, in the vicinity of pole boundary 271 with respect to the adjacent rotor pole 260D. The reason for this is that in FIG. 16, the lower of the two recesses 266A'must not be too small, so that it can be manufactured inexpensively, usually by punching. (If this recess becomes too small, it must be produced by expensive methods, e.g. by electrical discharge machining.)

In operation, segments 270' and 270" are saturated magnetically and therefore act practically like air.

Target region 270''' is connected, via a magnetic shunt 274', 274" that extends through cavity 266A', to a source region, namely the oblique side 264A' of permanent magnet 262A, so that an additional small magnetic flux is injected from this source region 264A', through magnetic shunt 274", 274', into target region 270'''. It has been shown that by this action, the shape of the induced voltage can be much better approximated to a sinusoidal shape. Since magnetic shunt 274', 274" is concealed inside rotor 36', this shunt has no substantial influence on the amplitude of the cogging torque, so that optimization of the cogging torque (by modifying the width of permanent magnets 262) and optimization of the electromagnetic torque (by flux injection) are possible largely independently of one another.

FIG. 17 shows that as a result of this action, the flux distribution in air gap 39 can be better approximated to a sinusoidal shape, since a small magnetic flux is injected in the region of the interpolar gaps (of rotor 36').

FIG. 18 is a view similar to FIG. 12 but for a motor having a rotor 36' as shown in FIGS. 15 through 17. The stator corresponds to that depicted in FIG. 9 and is therefore not shown again in FIGS. 15 through 17. The designations used in FIG. 18 are the same as in FIG. 12, and the reader is therefore referred to the explanations of FIG. 12 in order to avoid repetition.

A comparison of FIG. 18 with FIG. 12 shows that flux change dØ12/dt in regions 184' around the zero transitions has a substantially steeper profile than in FIG. 12, which results in a more favorable torque behavior. When, as described with reference to FIG. 12, the two profiles (shifted 120° el.) are added to yield summed curve dØ/dt, it is evident that the latter curve's profile is a much better approximation to a sine wave. As already explained, induced voltage uind has a profile practically identical to that of dØ/dt.

FIG. 19 once again shows the profile of uind as shown in FIG. 18, i.e. the (calculated) profile of induced voltage $U_{ind}$ for rotor 36' according to FIGS. 15 through 17. This profile is obviously a better approximation than the profile in FIG. 12 to the shape of a sine wave.

FIG. 20 shows the Fourier analysis for the voltage according to FIG. 19. A comparison with FIG. 14 indicates that the 5th and 7th harmonics have greatly decreased, while the 3rd, 9th, and 11th harmonics have become somewhat greater. The practical result is a substantially better electromagnetic torque in a motor that is equipped with a rotor 36' as shown in FIGS. 15 through 17.

The rotor shape according to FIGS. 15 through 17 is particularly suitable for small motors, but has the disadvantage that because of bevels 264A', 264A", etc. of the permanent magnets, relatively little magnet material can be accommodated in rotor 36'.

Magnets having a rectangular cross section will therefore be preferable for larger motors. One such variant is depicted in FIG. 21; in such a variant, the resulting shape of the magnetic shunt is somewhat different.

FIG. 21 shows a four-pole rotor 36" that is designed for the use of permanent magnets 290A through 290D having a rectangular cross section, in order to increase motor output. The pole shoes of the salient rotor poles are designated 292A through 292D, and are designed to produce a sinusoidal flux distribution. In a production version of this motor, magnets 290 have the dimensions 17.6×4.5×27 mm. The outside diameter of rotor 36" was 41.2 mm. Angle beta in this exemplifying embodiment was 126° el.

To retain rotor pole shoes 292A through 292D, this rotor 36" uses thin lands designated, as in FIGS. 15 and 16, as 270I, 270", and 270I".

Located to the left and to the right of rotor magnets 290 are respective two-part cavities 294A', 294A", etc. (cf. FIG. 22) that are subdivided by a magnetic shunt 296A. As depicted in FIG. 22, magnetic shunt 296A extends e.g. from a source segment 298A of magnet 290A to target region 270''', which here is located approximately midway between source segment 298A and pole boundary 271 and at which the flux injection occurs. The location of target region 270''' is determined principally by the fact that for reasons of production engineering, cavity 294A" must not become too small. By appropriate selection of the width of source segment 298A, it is possible to control the magnitude of the magnetic flux that is injected via magnetic shunt 296A into target region 270'".

FIG. 23 shows a variant of this in which source segment 298A is somewhat narrower. The resulting dimensions of magnets 290A' etc. for this variant were: 16.8×4.5×27 mm, angle beta=120° el. Here, therefore, magnet 290A' has a somewhat smaller angular extension beta than in FIG. 21, so that its width decreases (as compared with FIGS. 21 and 22) from 17.6 to 16.8 mm, i.e. by 0.8 mm. The optimum dimensions for the permanent magnets must therefore be ascertained, for each individual case, using optimization processes, in order to minimize the cogging torque and simultaneously to obtain, by flux injection, an electromagnetically generated torque profile that closely approaches the ideal shape.

The illustrative variants that have been disclosed demonstrate that numerous alterations and modifications are possible within the context of the invention, without departing from the inventive concept.

What is claimed is:

1. An electric motor which comprises:
   a stator (28) having a polyphase stator winding;
   a rotor (36; 36'; 36"). separated from the stator (28) by an air gap (39);
   said rotor having, on its side facing away from the air gap, a yoke made of magnetically conductive material,
   and having, on its side facing the air gap (39, a plurality of salient poles with pole shoes (260A, 260B, 260C, 260D; 292A, 292B, 292C, 292D) service to generate, in operation, sinusoidal induced voltages (Uind) in the polyphase stator winding;
   a respective recess (266A, 266B, 266C, 266D) being provided between the magnetic yoke (200) and each pole shoe (260A, 260B, 260C, 260D; 292A, 292B, 292C, 292D), in which recess at least one permanent magnet (262A, 262B, 262C, 262D; 290A, 290B, 290C, 290D) is arranged,
   said permanent magnet having two poles, one pole thereof facing the adjacent pole shoe and defining a pole shoe boundary,
   and the other pole thereof facing the yoke and defining a yoke boundary,
   said recess being adjoined, approximately in the circumferential direction and on each circumferential side thereof, by a respective low magnetic conductivity region;
   such a low magnetic conductivity region being bounded, on its side facing toward the air gap (39), by a retaining segment (270' 270") made of ferromagnetic material and serving to mechanically connect the cole shoe (260A, 260B, 260C, 260D; 292A, 292B, 292C, 292D to the magnetic yoke;
   and at least one flow path element (274', 274"; 290; 292; 296A) made of ferromagnetic material and extending from a source region (264A; 298A) of the at least one permanent magnet 262A, 262B, 262C, 262D; 290A, 290B, 290C, 290D) which source region is closer to the pole shoe boundary of the magnet than to the yoke boundary thereof, and through the low magnetic conductivity region adjacent to the source region, to a target region (270'") of the retaining segment (270", 270") adjacent to said respective low magnetic conductivity region, in order to conduct, towards said target region (270'"), an additional magnetic flux from the respective permanent magnet (262A, 262B, 262C, 262D).

2. The electric motor according to claim 1, wherein the magnetic yoke (200) of the rotor (36'; 36"), the pole shoes (260A, 260B, 260C, 260D; 292A, 292B, 292C, 292D), the retaining segments (270', 270"), and the flow path elements (274', 274"; 290; 292; 296A) are formed as laminations (116) of a lamination stack.

3. The electric motor according to claim 2, wherein, in order to produce a low magnetic conductivity region at the relevant location, at least one recess (266A'; 294A', 294A") is formed in the laminations.

4. The electric motor according to claim 1, wherein the retaining segments (270', 270") made of ferromagnetic material are, during operation, at least locally substantially magnetically saturated.

5. The electric motor according to claim 1, wherein a flow path element (274', 274"; 290; 292) extends to a target region (270'") that is connected to the relevant pole shoe (260A, 260B, 260C, 260D; 292A, 292B, 292C, 292D) via a part (270') of the retaining segment that is at least locally saturated during operation.

6. The electric motor according to claim 1, wherein a flow path element (274', 274"; 290; 292) extends to a target region (270'") that is connected to the magnetic yoke (200) via a part (270'") of the retaining segment that is at least locally saturated during operation.

7. The electric motor according to claim 1, wherein the at least one permanent magnet (262A, 262B, 262C, 262D) has, on its pole shoe boundary, a beveled edge facing toward an adjacent low magnetic conductivity region.

8. The electric motor according to claim 7, wherein the flow math element (274', 274") extends substantially from that beveled edge to the target region.

9. The electric motor according to claim 7, wherein the pole shoe boundary (260A, 260B, 260C, 260D) extends over at least a part of the beveled edge.

10. The electric motor according to claim 1, wherein the at least one permanent magnet (290A; 290A') has, on its side facing toward an associated low magnetic conductivity region, a cross section whose circumferential boundary transitions substantially orthogonally into said pole shoe boundary thereof,
    and the flow path element (296A) extends from said source region of that circumferential boundary through the low magnetic conductivity region to the target region (270'") of the retaining segment.

11. The electric motor according to claim 10, wherein the pole shoe (260A, 260B, 260C, 260D) extends beyond the circumferential boundary.

12. The electric motor according to claim 1, wherein a ratio, of the width of a rotor magnet (214; 262; 290A) to the pole pitch of the relevant rotor pole (206), is selected so as to minimize generation of any cogging torque.

13. The electric motor according to claim 1, wherein the average angular extent of a rotor magnet (214; 262, 290) is approximately 115 to 135 electrical degrees.

14. A method of influencing the shape of the induced voltages ($u_{ind}$) of an electronically commutated electric motor having:

a stator 28 having a polyphase winding and a rotor separated from the stator by an air gap (39);

said rotor having, on its side facing the air gap, a plurality of salient poles with pole shoes serving to generate, in operation, said induced voltages in the polyphase winding;

a respective recess (266A, 266B, 266C, 266D) being provided between the magnetic yoke (200) and each pole shoe (260A, 260B, 260C, 260D; 292A, 292B, 292C, 292(D), in which recess at least one permanent magnet (262A, 262B, 262C, 262D; 290A, 290B, 290C, 290D) is arranged;

said permanent magnet having two poles, one pole thereof facing the adjacent pole shoe and defining a pole shoe boundary, and the other pole thereof facing the yoke and defining a yoke boundary;

said recess being adjoined, approximately in the circumferential direction and on each circumferential side thereof, by a respective low magnetic conductivity region that is bounded, on its side facing toward the air gap (39), by a retaining segment (270', 270'''') made of ferromagnetic material and serving to mechanically connect the respective pole shoe (260A, 260B, 260C, 260D; 292A, 292B, 292C, 292D) to the magnetic yoke:

said voltage-shape-influencing method comprising the step of:

injecting an additional magnetic flux from an adjacent permanent magnet (262A, 262B, 262C, 262D), through the low magnetic conductivity region, into a respective retaining segment at a respective target region (270''') thereof.

15. The method according to claim 14, further comprising injecting said magnetic flux into a target region (270''') that lies approximately in a center part of the relevant retaining segment (270', 270'').

16. The method according to claim 14, further comprising injecting said magnetic flux into a target region 1270''') of the relevant retaining segment (270', 270'') that lies in the vicinity of a pole boundary (271) between the respective pole and an adjacent rotor pole.

17. The method according to claim 14, further comprising injecting said additional magnetic flux from a region of the permanent magnet (262A, 262B, 262C, 262D) adjacent to the pole shoe boundary, through a ferromagnetic flow path element (274', 274''; 290; 292) in the interior of the rotor (36'; 26''), into the target region (270''').

18. The method according to claim 15, further comprising injecting said additional magnetic flux from a region of the permanent magnet (262A, 262B, 262C, 262D) adjacent to the pole shoe boundary, through a ferromagnetic flow path element (274', 274''; 290; 292) in the interior of the rotor (36'; 26''), into the target region (270''').

19. The method according to claim 16, further comprising injecting said additional magnetic flux from a region of the permanent magnet (262A, 262B, 262C, 262D) adjacent to the pole shoe boundary, through a ferromagnetic flow path element in the interior of the rotor (36'; 26''), into the target region.

* * * * *

UNITED STATES PATENT AND TRADEMARK OFFICE
CERTIFICATE OF CORRECTION

PATENT NO. : 7,091,643 B2 Page 1 of 1
APPLICATION NO. : 10/797518
DATED : August 15, 2006
INVENTOR(S) : Burgbacher It is certified that error appears in the above-identified patent and that said Letters Patent is hereby corrected as shown below:

In column 3, line 52, "B2" should be -- 82 --
In column 6, line 34, "209A" should be -- 204A --
In column 8, line 61, after "$U_{ind}$" -- . -- should be inserted
In column 9, line 22, "264'''" should be -- 264D" --
In column 10, line 25, "uind" should be -- $U_{ind}$ --
In column 10, line 27, "uind" should be -- $U_{ind}$ --
In column 10, line 59, "2701" and "2701'" should be respectively -- 270' -- and -- 270''' --
In column 10, line 61, "ef" should be -- of --
In column 11, line 27, claim 1, line 3 "." after "...36")" should be -- , --
In column 11, line 31, claim 1, line 7, "(39" should be -- (39) --
In column 11, line 54, claim 1, line 30, "cole" should be -- pole --
In column 11, line 55, claim 1, line 31, after "292D" -- ) -- should be inserted
In column 11, line 60, claim 1, line 36, before "262A" -- ( -- should be inserted
In column 11, line 65, claim 1, line 41, "270''" should be -- 270' --
In column 12, line 28, claim 6, line 4, "(270''' )" should be -- (270'') --
In column 12, line 37, claim 8, line 2, "math" should be -- path --
In column 14, line 6, claim 16, line 2, "1270''''" should be -- 270''' --

Signed and Sealed this

Twenty-fourth Day of June, 2008

JON W. DUDAS
*Director of the United States Patent and Trademark Office*